United States Patent [19]
Haase

[11] Patent Number: 5,770,079
[45] Date of Patent: Jun. 23, 1998

[54] BIOLOGICAL INJECTOR AND METHOD OF APPLICATION THEREOF

[76] Inventor: Richard Alan Haase, Suite 422 Lexington Blvd., Sugarland, Tex. 77479

[21] Appl. No.: 882,568

[22] Filed: Jun. 25, 1997

[51] Int. Cl.$^6$ .................................. C02F 3/34; C02F 1/58
[52] U.S. Cl. ......................... 210/606; 210/611; 210/631; 210/632; 210/749; 210/150; 210/198.1
[58] Field of Search .................................. 210/606, 610, 210/611, 615, 631, 632, 749, 764, 150, 151, 198.1

[56] References Cited

U.S. PATENT DOCUMENTS

| | | | |
|---|---|---|---|
| 4,670,149 | 6/1987 | Francis | 210/608 |
| 4,678,567 | 7/1987 | Ueda | 210/150 |
| 4,810,385 | 3/1989 | Hater et al. | 210/606 |
| 5,262,051 | 11/1993 | Iwatsuka | 210/615 |

*Primary Examiner*—Thomas G. Wyse
*Attorney, Agent, or Firm*—Maryam Bani-Jamali

[57] ABSTRACT

This invention provides a biological injector suitable for biologically treating a fluid flowing through or contained in a collection or treatment system. The biological injector comprises at least one porous section for containing bacterial cultures, at least one non-porous solid section and at least one removable piece which, combinedly, form an enclosed container. Each porous section is attached to at least one non-porous solid section. At least one non-porous solid section is used as a base to which some components of the biological injector can be attached. Each removable piece is attached to one non-porous solid section. The biological injector may include means for fastening the biological injector to a selected location within the collection or treatment system. The biological injector may include means for feeding liquid bacterial cultures and additives to the fluid. When the removable piece is removed, bacterial cultures and, optionally, additives such as nitrogenous salts, phosphorous salts, buffers, surfactants, enzymes and organic substrates, are placed in the biological injector. The biological injector is immersed into the collection or treatment system. Any fluid that passes through the biological injector undergoes biological decomposition.

20 Claims, 7 Drawing Sheets

BIOLOGICAL INJECTOR AND METHOD OF APPLICATION THEREOF

BACKGROUND OF THE INVENTION

1. Field of the Invention

This invention relates to a biological injector suitable for seeding bacterial cultures to a fluid flowing through or contained in a collection or treatment system. A method of application of the biological injector is also described.

2. Description of the Prior Art

Continuously rising municipal populations have resulted in a placement of increased demands on existing collection and treatment systems of wastewater. (It should be noted that in describing this invention, reference is made to "wastewater". This term is intended to be broad and to include sewage and water which is contaminated by chemicals or by any other components, such that the water is not usable or disposable without treatment.) Current collection and treatment facilities are becoming incapable of collecting and treating assigned amounts of wastewater (e.g. from restaurants and food production plants) in order to control fats, oils, grease, hydrogen sulfide, sulfur dioxide, COD, BOD and ammonia of the wastewater. Buildups of fats, oils and grease within the collection and treatment systems are becoming increasingly costly for municipalities. In many cases, wastewater has to be collected at one location before being transported to wastewater treatment plants. Grease and other organic matter of the wastewater that are not decomposed prior to reaching these collection points assemble, harden and remain at such locations and have to be removed (e.g. by trucks). Also, if left unchecked, certain types of wastewater outflow are so high in organic matter, such as grease, that the organic matter will clog at least one critical point of the collection and treatment system or will reach the primary treatment plant and, upon being indigestible by the ubiquitous bacteria, must be skimmed off and discarded in bulk after collection. Often, such buildups are so severe that some lines of the collection and treatment systems become filled up, requiring costly cleaning and/or repairs. Further, high concentrations, that are above the maximal concentration for which the collection and treatment facility has been designed or operated for, of fats, oils and grease could cause many operational difficulties for that wastewater collection and treatment facility. Simultaneously, hydrogen sulfide and sulfur dioxide buildups are continuously occurring in the collection and treatment facilities. Also, sulfuric acid, resulting from production of hydrogen sulfide by sulfite-reducing bacteria, leads to corrosion in the collection and treatment systems. Corroded equipments of these collection and treatment systems have to be replaced prematurely. Such premature corrosions may cost a municipality millions of dollars in damages. In addition, hydrogen sulfide and sulfur dioxide are health hazards and have an objectionable odor. State and local governments are investigating regulations on allowable concentrations of hydrogen sulfide at boundaries of the collection and treatment facilities of wastewater.

Many recent solutions for increasing costs of transportation, cleaning and repair and for expenses resulting from required premature replacements of corroded equipment have been based upon bacterial treatments of the wastewater. Using bacterial cultures, grease and other organic matters are converted to lower molecular weight compounds which will not accumulate within the collection and treatment system. However, presently applied methods for biological control of fats, oils, grease, hydrogen sulfide, sulfur dioxide, COD, BOD and ammonia in wastewater and existing collection and treatment systems have had many shortcomings.

In one applied system for collection and treatment of wastewater, bacterial cultures that have been dried (usually on bran, rice and/or peanut hulls) are introduced into the collection and treatment system either directly or after the bacterial cultures have been rehydrated. However, since the bacteria become mobile in a flowing aqueous environment, specific areas within the system that require treatment may be missed. Accuracy and efficiency of application of bacterial cultures are dependent on the flowrate and the location of introduction of the bacterial cultures. As a result, bacterial cultures must be added frequently. In addition, reduction of hydrogen sulfide and sulfur dioxide to elemental sulfur and removal or replacement of sulfite-reducing bacterial populations cannot be achieved with the current dried bacterial cultures.

In another case, liquid bacterial cultures are directly introduced, preferably by pumping, into the collection and treatment system. Although the liquid bacterial cultures are introduced more directly into the desired location in the collection and treatment system, liquid bacterial cultures cannot be produced at the quality or quantity of bacterial cultures that are dried on a carrier. For example, the cell count of dried bacterial cultures is 3 to 5 billion cells per gram, where liquid bacterial cultures are usually produced for less than 1 billion cells per gram. In addition, reduction of hydrogen sulfide and sulfur dioxide to elemental sulfur and removal or replacement of sulfite-reducing bacterial populations cannot be achieved by applying currently-used bacterial cultures.

In yet another case, a wastewater treatment system is introduced that comprises a fabric membrane. The fabric membrane is used to seed bacteria, that have been dried on a carrier, to flowing wastewater. However, the fabric membrane can be easily torn in an aggressive environment (such as a sewer line), resulting in a decrease in durability and applicability of the wastewater treatment system. Also, there is a very limited control over the positioning of the fabric membrane, that tends to move with the flow of the wastewater, and, therefore, uniform treatment is eventually inhibited. In addition, it is not possible to provide necessary surfactants directly with the bacterial cultures in the same treatment system, thereby preventing any simultaneous introduction of the surfactants and bacterial cultures on the same hard grease surface. Also, direct provision of liquid bacterial cultures and dried bacterial cultures in the same treatment system cannot be achieved. This treatment system is not reusable, is not capable of reducing hydrogen sulfide and sulfur dioxide to elemental sulfur and is not able to remove or replace sulfite-reducing bacterial populations.

Many other similar inventions have been developed, some of which still exist in the market. The standard procedures of introducing bacterial cultures to various points in a wastewater on an intermittent basis do not provide sufficient residence time for the bacterial cultures to perform efficiently. There is, therefore, a continuing and growing need for a delivery system that efficiently provides dried bacterial cultures along with nutrients, surfactants and liquid bacterial cultures to a wastewater to remove hydrogen sulfide, sulfur dioxide, fats, oils, grease, COD, BOD and ammonia. Disclosed is a biological device that is suitable for seeding bacterial cultures, whether dried or liquid, to a fluid flowing through or contained in a collection or treatment system and that is capable of removing hydrogen sulfide, sulfur dioxide, fats, oils, grease, COD, BOD and ammonia from the fluid.

SUMMARY OF THE INVENTION

A primary object of this invention is to devise a simple, reliable and effective device suitable for seeding bacterial cultures to a fluid flowing through or contained in a collection or treatment system.

Another object of the invention is to devise a device for simultaneously seeding bacterial cultures to and introducing surfactants to a fluid flowing through or contained in a collection or treatment system.

Yet another object of this invention is to devise a device for simultaneously seeding dried bacterial cultures to and introducing liquid bacterial cultures to a fluid flowing through or contained in a collection or treatment system.

An additional object of this invention is to devise a device for seeding bacterial cultures to a fluid flowing through or contained in a collection or treatment system, resulting in a reduction of hydrogen sulfide and sulfur dioxide to elemental sulfur and in removal and replacement of sulfite-reducing bacterial populations.

A final object of this invention is to provide a durable and reusable device that is suitable for seeding bacterial cultures to a fluid flowing through or contained in a collection or treatment system, that is inexpensive to manufacture and operate and that requires minimal labor for manufacturing and operation.

Additional objects and advantages of the invention will be set forth in part in a detailed description that follows, and in part will be obvious from the description, or may be learned by practice of the invention.

The present invention is a biological injector suitable for biological treatment of a fluid flowing through or contained in a collection or treatment system. The biological injector serves as a container for bacterial cultures. The fluid of the collection or treatment system passes through the biological injector. The biological injector comprises at least one porous section for containing bacterial cultures, at least one non-porous solid section and at least one removable piece. Each porous section is attached to at least one non-porous solid section. At least one non-porous solid section is used as a base to which some components of the biological injector can be attached. Each removable piece is attached to one non-porous solid section. Combinedly, all porous sections, non-porous solid sections and removable pieces of each biological injector form an enclosed container. The biological injector may include means for fastening the biological injector to a selected location within the collection or treatment system. The biological injector may include means for feeding liquid bacterial cultures and additives to the fluid. When the removable piece is removed, bacterial cultures are placed in the biological injector. Additives, such as nitrogenous salts, phosphorous salts, buffers, surfactants, enzymes and organic substrates, may be added along with the bacterial cultures. The removable piece is, then, attached to the biological injector to form, along with other components of the biological injector, an enclosed container for the bacterial cultures. The biological injector is, then, immersed into the fluid and bacteria are released into the fluid that enters and leaves the biological injector via the porous sections. Upon being passed through the biological injector, the fluid undergoes biological decomposition and removal by the function of the bacterial cultures.

It is to be understood that the descriptions of this invention are exemplary and explanatory, but are not restrictive, of the invention. Other objects and advantages of this invention will become apparent from the following specification and from any accompanying charts, tables, examples and drawings.

BRIEF DESCRIPTION OF CHARTS, TABLES AND DRAWINGS

Any accompanying charts, tables, examples and drawings which are incorporated in and constitute a part of this specification, illustrate examples of preferred embodiments of the invention and, along with the description, serve to explain the principles of the invention.

DETAILED DESCRIPTION OF THE PREFERRED EMBODIMENT

Figure 1:
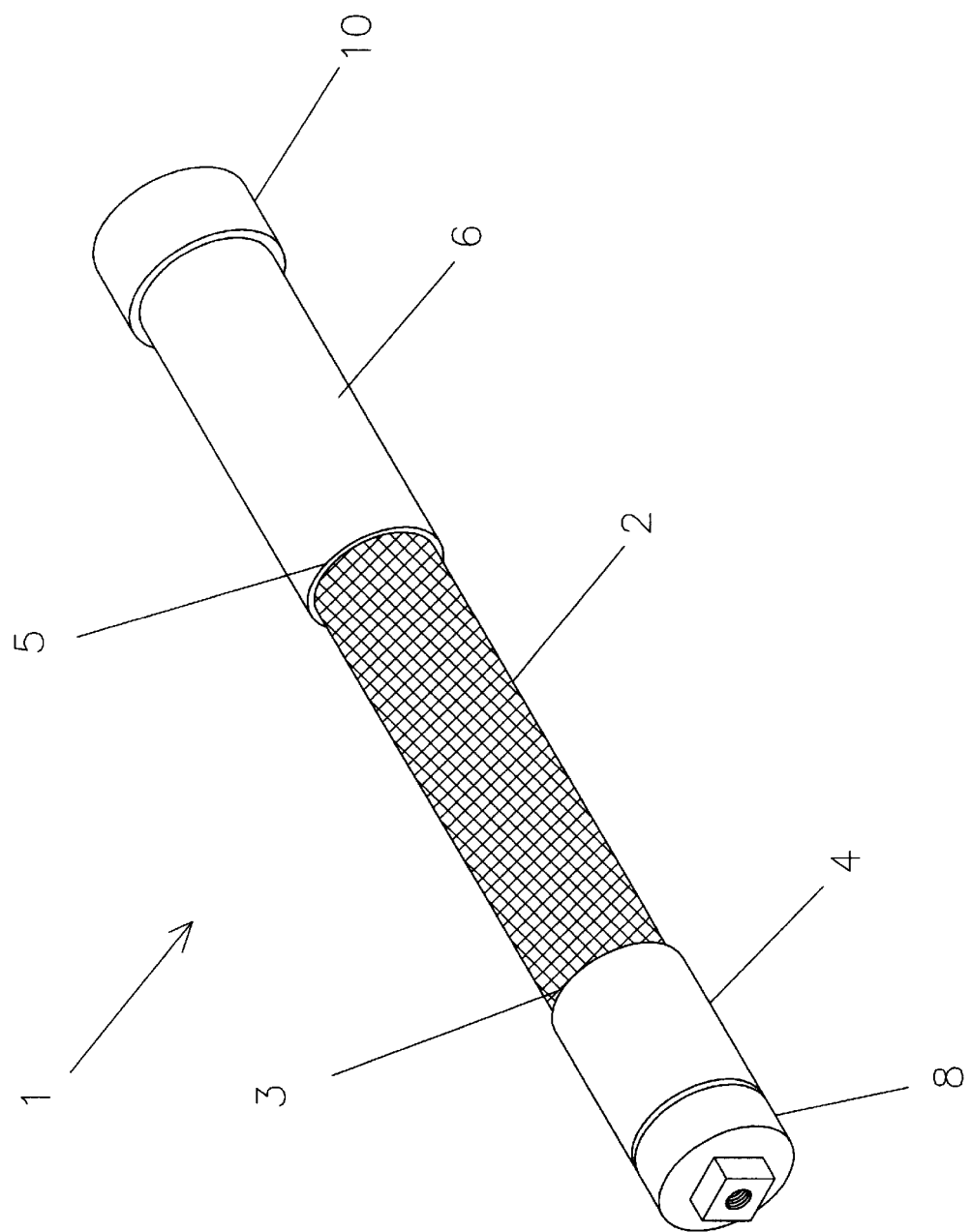
FIG. 1 shows an isometric view of a biological injector for seeding bacterial cultures to a fluid that enters the biological injector.

Several preferred embodiments of the present invention are illustrated in any charts, tables, examples and drawings that are included. It should be emphasized that the embodiments, described in the specification and demonstrated in the drawings, serve as examples to illustrate and explain the principles of the invention more clearly and shall not be interpreted in a limiting sense.

The present invention provides a device that is suitable for seeding bacterial cultures 21 to a fluid flowing through or contained in a collection or treatment system. In a preferred embodiment, this invention involves a biological injector 1 (or bio-injector 1) that promotes and facilitates the preliminary biological reduction of organic material in wastewater and that is used to reduce oil, grease, hydrogen sulfide and some other chemicals which normally collect and deposit in municipal wastewater. The method of operation of said bio-injector 1 is also discussed.

Figure 2:
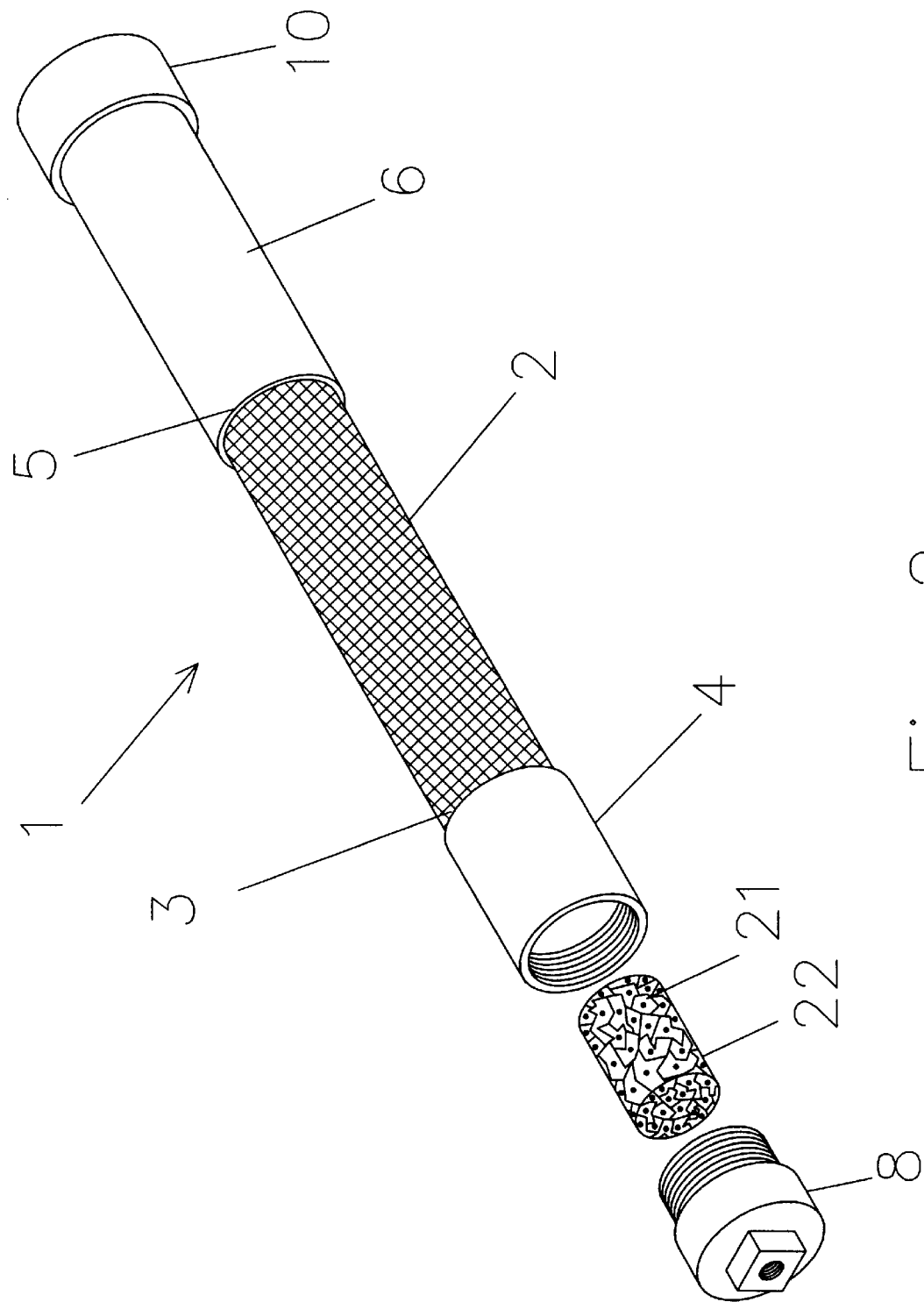
FIG. 2 shows the biological injector of FIG. 1, with a removable piece having been removed for placement of demonstrated bacterial cultures in the biological injector.
Figure 7:
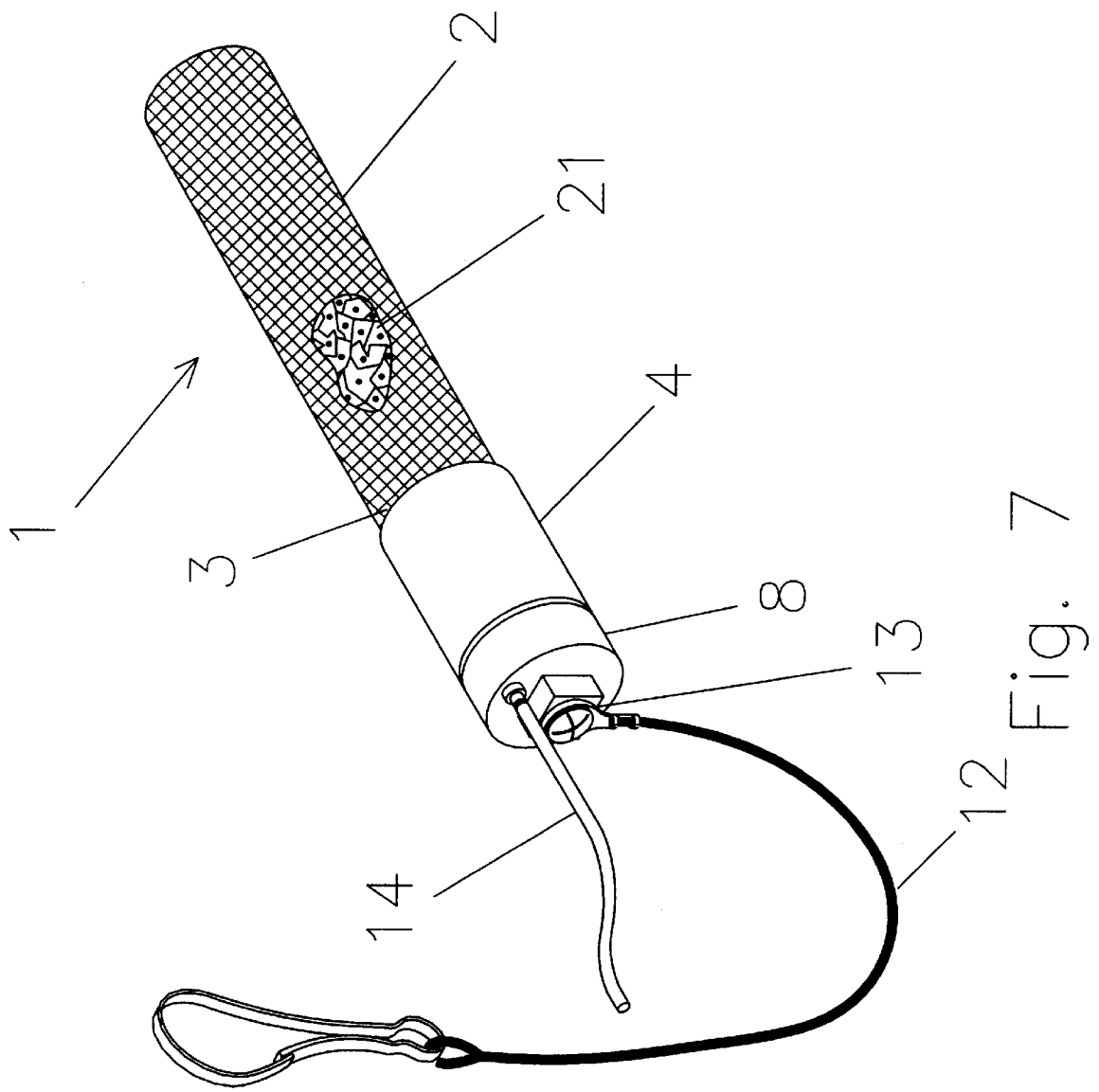
FIG. 7 shows an isometric view of a biological injector for seeding bacterial cultures to a fluid that enters the biological injector, with a means for feeding liquid bacterial cultures into the biological injector and a means for fastening the biological injector to any selected location.

In order to seed bacterial cultures 21 to the fluid, the bio-injector 1 is positioned within the fluid flowing through or contained in the collection or treatment system. The bio-injector 1 serves as a container of bacterial cultures 21 and is suitable for seeding bacterial cultures 21 to the fluid passing through the bio-injector 1. The bio-injector 1 comprises at least one porous section 2 for containing bacterial cultures 21, at least one non-porous solid section 4 and at least one removable piece 8. Please refer to FIG. 7). At least one piece of the bio-injector 1 has to be removable in order to allow, upon removal of the removable piece 8, the placement of bacterial cultures 21 and surfactants in the bio-injector 1. (Please refer to FIG. 2.) Each porous section 2 is attached to at least one non-porous solid section 4. At least one non-porous solid section 4 is used as a base to which some components of the bio-injector 1 can be attached. Each removable piece 8 is attached to one non-porous solid section 4. Combinedly, all porous sections 2, non-porous solid sections 4 and removable pieces 8 of each bio-injector 1 form an enclosed container and a sealed environment for storage, wetting and release to the fluid of bacterial cultures 21, surfactants and nutrients. (Please refer to FIG. 1.).

Figure 3:
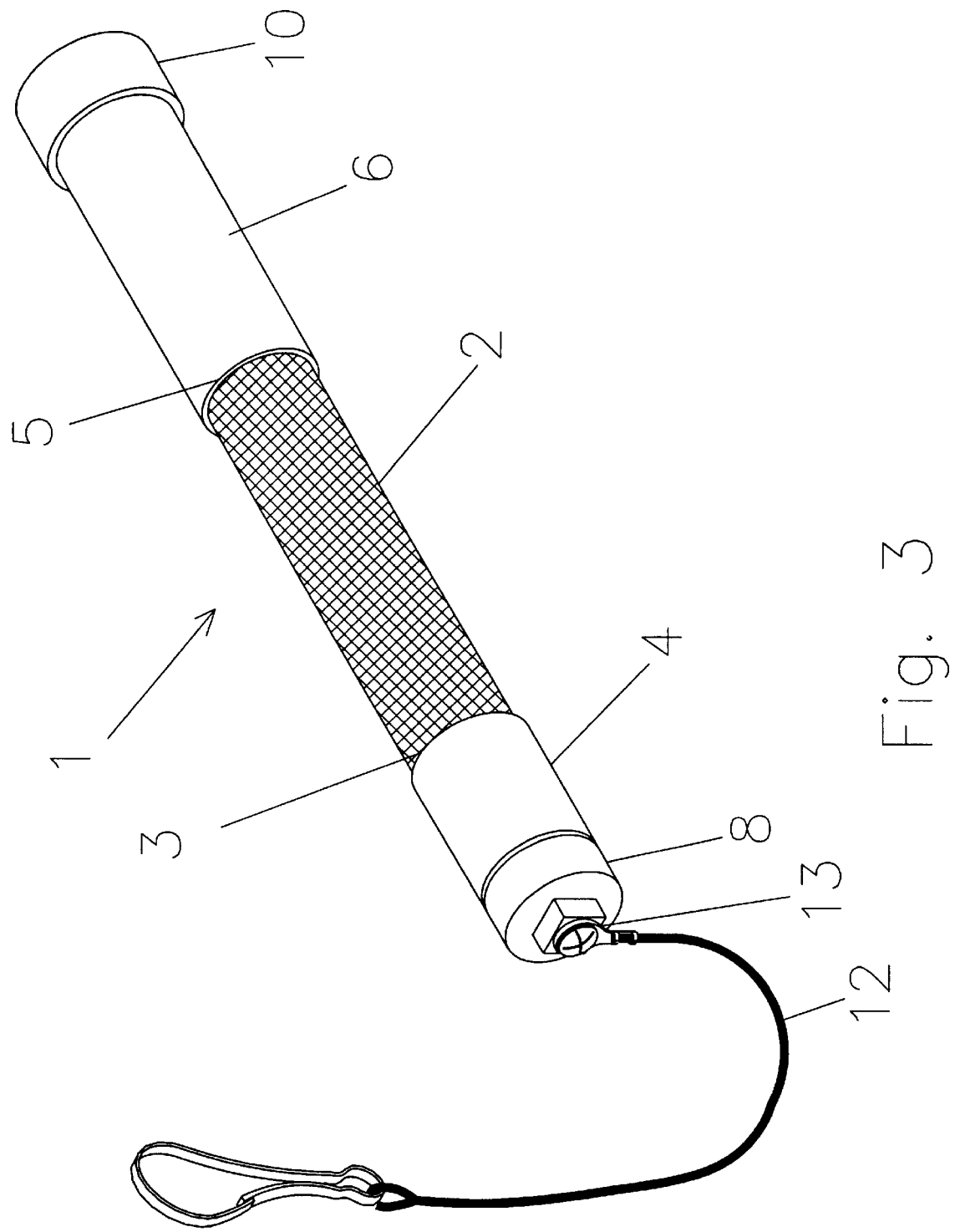
FIG. 3 shows an isometric view of a biological injector for seeding bacterial cultures to a fluid that enters the biological injector, with a means for fastening the biological injector to a selected location.
Figure 4:
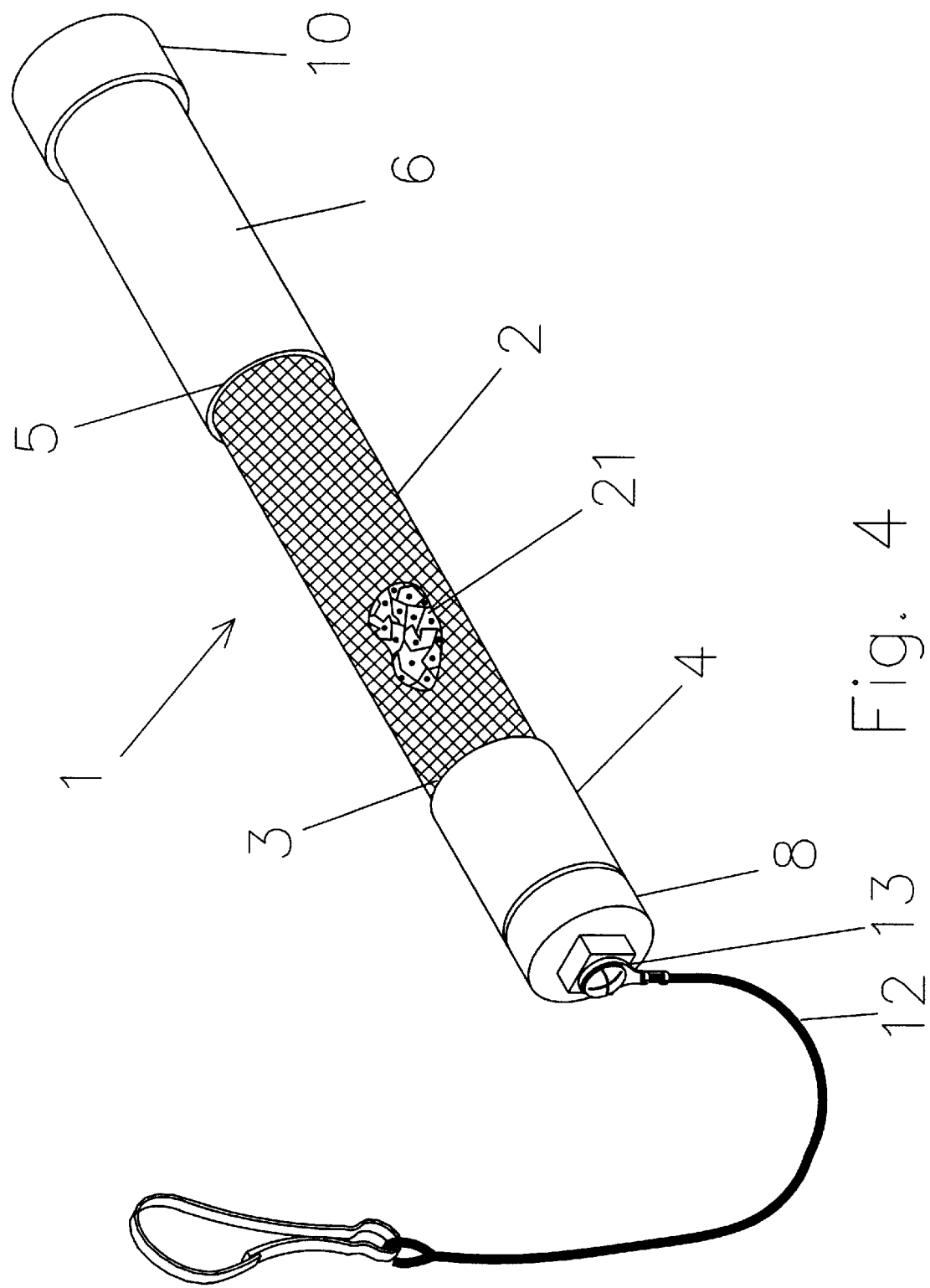
FIG. 4 shows a cut-away view of the biological injector of FIG. 3, with bacterial cultures having been placed in the biological injector.
Figure 5:
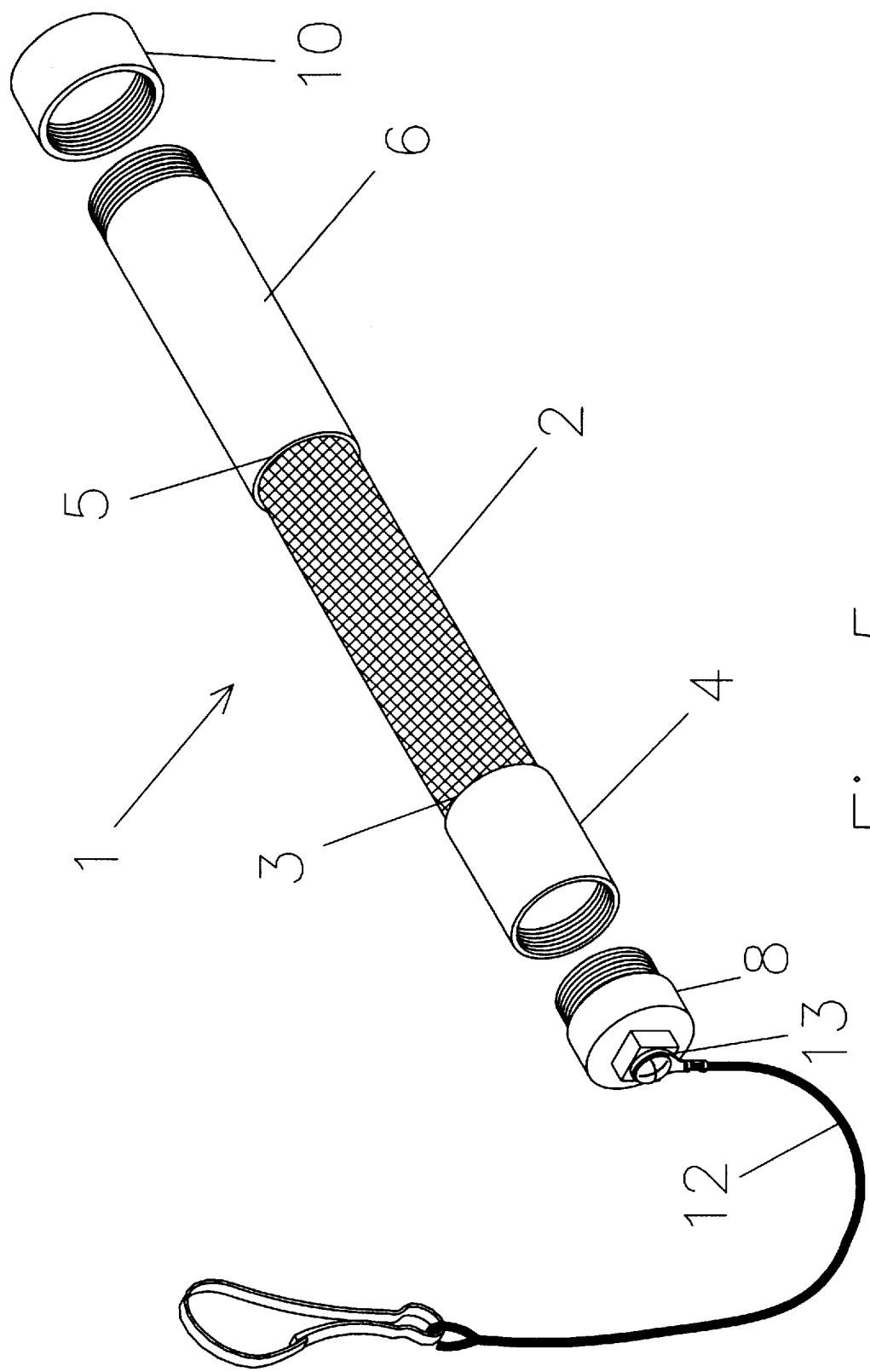
FIG. 5 shows an exploded view of the biological injector of FIG. 3.
Figure 6:
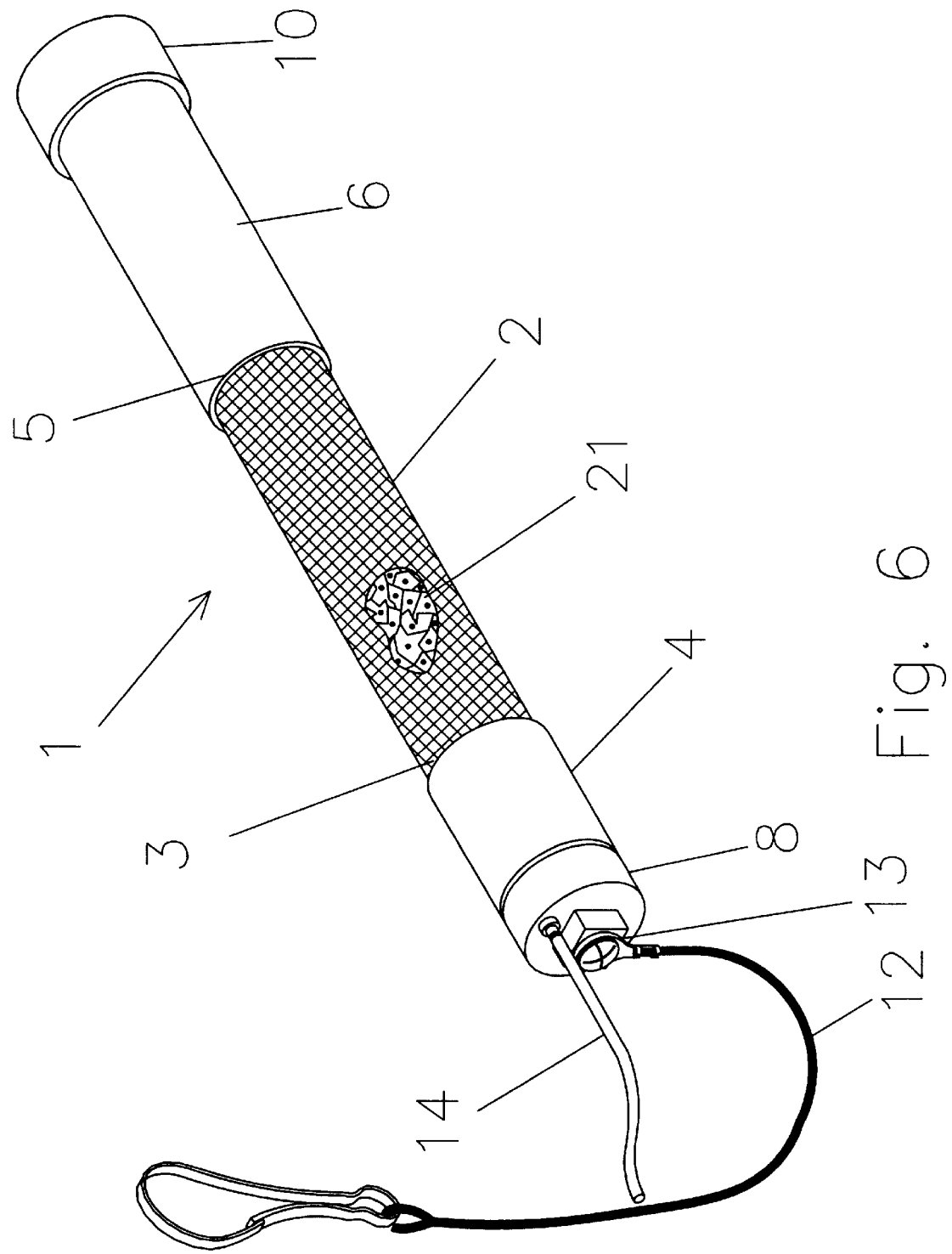
FIG. 6 shows an isometric view of a biological injector for seeding bacterial cultures to a fluid that enters the biological injector, with a means for feeding liquid bacterial cultures into the biological injector and a means for fastening the biological injector to any selected location.

The non-porous solid sections 4 serve to hold the porous sections 2 in a more stable position and to protect the porous sections 2 from any physical damage which could result from the fluid. However, the porous sections 2 have an exposed surface area that is large enough to allow the fluid to contact and wet the bacterial cultures 21 and, if the bacterial cultures 21 are in a carrier 22 (as shown in FIG. 2), to enable the bacteria to be released from the carrier 22. The porous sections 2 of the bio-injector 1 allow essentially unimpeded fluid flow into, through and out of the bio-injector 1.

The bio-injector 1 may include means 12 for fastening (referred to hereafter as "fastening means 12") the bio-injector 1 to a selected location within the collection or treatment system. Each fastening means 12 is preferably attached to a removable piece 8 or to a non-porous solid section 4. The fastening means 12 may be used to hold or to fasten the bio-injector 1 within the fluid and to secure the bio-injector 1 in a preferred location in the fluid. Upon a proper choice and positioning of the fastening means 12, the bio-injector 1 may be held vertically, horizontally or in any other desired direction. Even though the bio-injector 1 cannot be retained motionless and may move in various directions, the bio-injector 1 may be kept at a relatively established position and the flow and misplacements of the bio-injector 1 are minimized. The fastening means 12 prevents unplanned movements of the bio-injector 1 in the fluid. It may be redundant to use the fastening means 12 with the bio-injector 1 in certain conditions. For example, when the bio-injector 1 is used in a lake, pond or any other relatively stable body of fluid that lacks any significant flow, a fastening means 12 may not be needed to prevent the movement of the bio-injector 1.

The bio-injector 1 may include a means 14 for feeding (referred to hereafter as "feeding means 14") liquid bacterial cultures and additives to the fluid flowing through or contained in the collection or treatment system. (Please compare FIG. 1 with FIG. 6.) The feeding means 14 may be attached, removably or irremovably, to the bio-injector 1. Preferably, the feeding means 14 is attached to a removable piece 8 or to a non-porous solid section 4.

In another preferred embodiment, fastening means 12 and feeding means 14 may be used within the same collection or treatment system and may be each attached to a removable piece 8 or to a non-porous solid section 4. For example, if a faster input of liquid bacterial cultures 21 is needed, several feeding means 14 may be attached to the same bio-injector 1. In some embodiments, a feeding means 14 may be capable of serving as a fastening means 12 as well. Preferably, the feeding means 14 is used to add surfactants, liquid bacterial cultures 21 or both. Buffers can also be added to the bio-injector 1 via the feeding means 14. Sodium carbonate, sodium bicarbonate, sodium phosphate, calcium oxide, calcium hydroxide, magnesium oxide and magnesium hydroxide are some preferred buffers.

As can be seen, the structure of the bio-injector 1 provides substantial flexibility and improvement in the performance and operation of the bio-injector 1. Since solid materials may come in contact with the bio-injector 1 and possibly become entangled with the bio-injector 1, a streamlined design is preferred. Cylindrical designs, which provide the fewest locations to trap solid debris, are preferred. The non-porous solid sections 4 and the porous sections 2 are preferably irremovably attached to one another. However, any removable piece 8 may be removed and replaced very easily and at any time when the removable piece 8 is out of the fluid. Any removable piece 8 may be substituted by a removable piece 8 of the same size. Therefore, the locations of fastening means 12 and feeding means 14 may be easily changed on the same bio-injector 1. In addition, by changing a removable piece 8, the bio-injector 1 may gain or lose feeding means 14, fastening means 12 or both.

The removable pieces 8 and the non-porous solid sections 4 of the bio-injector 1 preferably consist of plastic, metal or metal alloys. The material is chosen so as to not deteriorate during application of the bio-injector 1. Plastic is preferred since plastic is more durable, lighter, less expensive and more corrosion-resistant than metal or metal alloys. In addition, plastic can be impervious and resistant to the variety of chemicals that may be introduced into the fluid.

The porous section 2 is preferably made of any fabric that is sufficiently strong and durable to be capable of holding a carrier 22 of bacterial cultures 21 or of other suitable microorganisms. (It should be noted that although reference is mostly made to bacteria and bacterial cultures 21, the present invention also holds for any other microorganisms that are effective in the treatment of the fluid. As long as a selected microorganism is capable of the desired treatment of the fluid, no restriction is imposed on the kind of the microorganisms used.) The bacterial cultures 21 are three-dimensional and have surfaces of various shapes. Surfaces with specific shapes and areas provide a larger volume than other surfaces with the same area do and, thus, have a more effective three-dimensional characteristic. The carrier 22 may contain from about ½ lb. to about 50 lbs. of dried bacterial cultures 21. The fabric should consist of materials that will not deteriorate during the application of the bio-injector 1. While being strong and durable, the fabric must be porous to the fluid and must provide a mechanism to allow the transfer of bacteria, nutrients and buffers to the fluid. In a preferred embodiment, the fabric consists of woven cloth, woven plastic, wire mesh or plastic screen. For example, the fabric may be formed of intertwisted vinylidene chloride yarns, that are corrosion resistant, or of other spongy, mesh-like or fibrous synthetic resin. (The openings are required to be at least of a size to allow the bacterial cultures 21 to seed the fluid. For purposes of illustration, some openings or slots in the fabric of the permeable section 2 and some bacterial cultures 21 are demonstrated in some figures. It should be noted that the openings or slots are not demonstrated on scale in reference to other parts of the bio-injector 1.)

In order to more clearly describe the principles of the invention, an embodiment comprising a porous section 2, a first and second non-porous solid section 4,6 and a first and second removable piece 8,10 is used. The porous section 2 has a first end 3 and a second end 5. The first non-porous solid section 4 is attached to the first end 3 of the porous section 2. The second non-porous solid section 6 is attached to the second end 5 of the porous section 2. The first removable piece 8 is attached to the first non-porous solid section 4, such that the first removable piece 8 and the porous section 2 are positioned on opposite ends of the first non-porous solid section 4. The second removable piece 10 is attached to the second non-porous solid section 6, such that the second removable piece 10 and the porous section 2 are positioned on opposite ends of the second non-porous solid section 6. The porous section 2 is positioned between and is adhered to or mechanically attached to the first non-porous solid section 4 and the second non-porous solid section 6. Preferably, a fastening means 12 is attached to the first removable piece 8 (shown in FIG. 7). When the bio-injector 1 consists of more than one removable piece 8,10 (e.g. as shown in FIGS. 3, 5 and 6), the fastening means 12 may be attached to either removable piece 8,10. To facilitate inspection or removal of the bio-injector 1, a strap (such as a rope, cable or hose) serves as the fastening means 12 and is attached by a connecting means 13 (such as a grommet or an eye bolt) to the bio-injector 1. (Please refer to FIGS. 3, 4 and 5.) In another preferred embodiment, a hose is used as the feeding means 14 and is attached to the first removable piece 8 (refer to FIG. 6).

At any time when the removable piece 8 is removed, bacterial cultures 21 may be added to the bio-injector 1. If a feeding means 14 is used, liquid bacterial cultures 21 can be added, via the feeding means 14, even when the bio-injector 1 is completely submerged in the fluid. Therefore, even during operation of the bio-injector 1, additional bacterial cultures 21 may be positioned in the bio-injector 1.

For treating the fluid, the bacterial cultures 21 are accompanied by additives such as nitrogenous salts, phosphorous salts, buffers, surfactants, enzymes and organic substrates which function to stimulate the growth of the bacteria and enzyme production within and immediately after their release from the bio-injector 1. The bacterial cultures 21, surfactants and nutrients that are stored, moisturized and released to the fluid are required for removing hydrogen sulfide, sulfur dioxide, fats, oils, grease, COD, BOD and ammonia from the fluid. The bacterial cultures 21 and surfactants added to the bio-injector 1 must be able to degrade the fluid in a selected collection system. In general, the bacteria and surfactants must be capable of consuming hydrogen sulfide and sulfur dioxide, of oxidizing hydrogen sulfide and sulfur dioxide to sulfate, ammonia to nitrite and nitrate and hydrocarbons to carbon dioxide and water, of outcompeting sulfite-reducing bacteria, of liquefying and digesting animal, vegetable and synthetic oils and greases and of oxidizing organics that register as COD and as BOD. Some suitable bacterial cultures 21 that may be used with the present invention are bacillus, pseudomonas, escherichia, arthobacter, achromobacter, flavobacterium and bdellovibrio. At least one species of said bacterial cultures 21 and mixtures thereof are added to the fluid. For the removal of hydrogen sulfide, the strain thiobacillus is preferably used. Thiobacillus have the ability to consume sulfides, thereby removing hydrogen sulfide and sulfur dioxide from the fluid. Further, under facultative or anoxic conditions, thiobacillus have the ability to outcompete with the sulfite-reducing bacteria, thereby replacing the sulfite-reducing bacteria and eliminating the source of hydrogen sulfide, sulfur dioxide and sulfuric acid.

The bio-injector 1 is capable of high-volume treatment and stable long-term operation, causing little clogging. Even if clogging occurs, it can be eliminated by very simple washing procedures. The diameter of the bio-injector 1, as well as the length of the bio-injector 1, can be adjusted in proportion to the amount of dried bacterial cultures 21, nutrients and buffers required for the treatment of the fluid. The amount of bacterial cultures 21 that is introduced into the bio-injector 1 is adjusted based upon the concentration of unwanted chemicals such as oil, grease, hydrogen sulfide and some other chemicals in the fluid and based upon the rate of flow and the amount of fluid that is to be treated. If the amount of bacterial cultures 21 cannot be adjusted in relationship to the type of and amount of unwanted chemicals in the fluid, optimal results cannot be achieved. When there is an insufficient amount of bacterial cultures 21 or when the rate of flow of the fluid is higher than desired, there is an insufficient amount of treatment of the fluid. On the other hand, if there are larger amounts of bacterial cultures 21 than required or if the rate of flow of the fluid is slower than desired, the treatment of the fluid is not as efficient and economical as possible and the time of treatment is unnecessarily prolonged. In the present invention, the rate of removal of unwanted chemicals can be adjusted at will, a stable treatment can be carried out at all times and operation control is simple, less time-consuming and requires a minimal amount of labor. As a result, the bio-injector 1 is more economical and more efficient and yields more preferable results. Optimal results are obtained in the treatment of fluid when the present invention is used, in spite of variations in BOD, in COD, in the amount of sulfur and nitrogenous compounds and in the amount of contaminants in the fluid.

In use, a removable piece 8 is removed for filling the bio-injector 1 with dried bacterial cultures 21, nutrients and buffers. Dried bacterial cultures 21 and nutrients for the bacterial cultures 21, along with other desired additives, are placed in the bio-injector 1. No covering, container or carrier 22 needs to accompany the bacterial cultures 21 that are positioned in the bio-injector 1. However, in a preferred embodiment, the carrier 22 that contains the bacterial cultures 21 is placed in the bio-injector 1 (Please refer to FIG. 2.). The carrier 22, comprising water-soluble plastics, starts to dissolve as soon as the carrier 22 is contacted by water. Polyethylene, that contains starch in the polymer, can serve as a water-soluble plastic. In cases where the treatment of the fluid is more difficult, a feeding means 14 is attached to the bio-injector 1 for the addition of surfactants, liquid bacterial cultures 21 and nutrients if desired.

Upon addition of the bacterial cultures 21 and other desired additives, the removable piece 8 is attached to the bio-injector 1 to form, along with the other components of the bio-injector 1, an enclosed container for the bacterial cultures 21. The bio-injector 1 is, then, immersed into the fluid. As the fluid contacts and flows through the porous section 2 of the bio-injector 1, the dried bacterial cultures 21 are directly contacted by, wetted by and released into the fluid, providing the fluid with a continuous seed of bacteria from the bio-injector 1. Meanwhile, liquid bacterial cultures 21 may be added to the fluid via the feeding means 14. Also, any desired chemical additives, such as nutrients and surfactants, are dissolved in and fed into the fluid. Upon being released, the bacteria start to act on the wastewater, oil, grease, hydrogen sulfide and some other chemicals present in the fluid. The released bacteria exit the bio-injector 1 via openings in the porous section 2. Whenever desired, additional amounts of bacterial cultures 21 and additives may be placed in the bio-injector 1.

Thus, the bio-injector 1 may be used to simultaneously introduce surfactants, nutrients, buffers and bacterial cultures 21 to the fluid. In addition, liquid bacterial cultures 21 and dried bacterial cultures 21 may be simultaneously introduced to the fluid by using a feeding means 14 with the bio-injector 1. The bio-injector 1 is capable of reducing hydrogen sulfide and sulfur dioxide to elemental sulfur and of removing and replacing sulfite-reducing bacterial populations.

With the bio-injector 1 being reusable, the application of the bio-injector 1 is considerably less expensive than the application of other devices and systems that are used for seeding bacterial cultures 21 to the fluid. Although the amount of debris that remains in the bio-injector 1 is minimal, periodical washing and cleaning of the bio-injector 1 is helpful to eliminate any long-term clogging of the bio-injector 1. In addition, with the bio-injector 1 being so simple in construction, minimal labor is required for its manufacture and operation. Despite its simple construction, results obtained from the application of the bio-injector 1 demonstrate that the bio-injector 1 is considerably more reliable and effective than other existing devices and systems used for seeding bacterial cultures 21 to fluid flowing through or contained in a collection or treatment system.

Certain objects are set forth above and made apparent from the foregoing description, drawings and examples. However, since certain changes may be made in the above description, drawings and examples without departing from the scope of the invention, it is intended that all matters contained in the foregoing description, drawings and examples shall be interpreted as illustrative only of the principles of the invention and not in a limiting sense. With respect to the above description and examples then, it is to be realized that any descriptions, drawings and examples deemed readily apparent and obvious to one skilled in the art and all equivalent relationships to those stated in the examples and described in the specification or illustrated in the drawings are intended to be encompassed by the present invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention which, as a matter of language, might be said to fall in between.

What is claimed as invention is:

1. A biological injector, suitable for seeding bacterial cultures to a fluid flowing through or contained in a collection or treatment system, that comprises:
   (a) at least one porous section for containing bacterial cultures;
   (b) at least one non-porous solid section, with each porous section being attached to at least one non-porous solid section and with at least one non-porous solid section being used as a base to which some components of the biological injector can be attached; and
   (c) at least one removable piece that is attached to one non-porous solid section and that is removed to allow placement of bacterial cultures in the biological injector;
   such that, upon attachment of each removable piece to the corresponding non-porous solid section, all porous sections, non-porous solid sections and removable pieces of the biological injector form an enclosed container for storage of bacterial cultures and for wetting and release to the fluid of bacterial cultures when the biological injector is placed in the fluid.

2. The biological injector according to claim 1, wherein the biological injector is cylindrical in order to minimize entrapment of solid debris by the biological injector.

3. The biological injector according to claim 1, wherein the biological injector includes means for fastening the biological injector to a selected location within the collection or treatment system.

4. The biological injector according to claim 3, wherein each means for fastening is attached to a removable piece or to a non-porous solid section.

5. The biological injector according to claim 1, wherein the biological injector includes means for feeding liquid bacterial cultures and additives to the fluid.

6. The biological injector according to claim 5, wherein each means for feeding is attached to a removable piece or to a non-porous solid section.

7. The biological injector according to claim 1, wherein means for feeding liquid bacterial cultures and additives to the fluid and means for fastening the biological injector to a selected location within the collection or treatment system are each attached to a removable piece or to a non-porous solid section.

8. The biological injector according to claim 1, wherein the porous section consists of any fabric that, while being porous to the fluid in the container and treatment system and allowing transfer of the bacterial cultures, is sufficiently strong and durable to be able to hold a carrier containing up to about 50 lbs. of dried bacterial cultures.

9. The biological injector according to claim 8, wherein the fabric consists of woven cloth, woven plastic, wire mesh or plastic screen.

10. The biological injector according to claim 1, wherein each removable piece and each non-porous solid section consist of plastic, metal or metal alloys.

11. The biological injector according to claim 1, wherein the bacterial cultures are accompanied by at least one additive from a group of additives consisting of nitrogenous salts, phosphorous salts, buffers, surfactants, enzymes and organic substrates.

12. The biological injector according to claim 11, wherein the buffers consist of sodium carbonate, sodium bicarbonate, sodium phosphate, calcium oxide, calcium hydroxide, magnesium oxide and magnesium hydroxide.

13. The biological injector according to claim 1, wherein the bacterial cultures in the biological injector comprise at least one species of bacillus, thiobacillus, pseudomonas, escherichia, arthobacter, achromobacter, flavobacterium or bdellovibrio and any mixtures of said species.

14. A method for biodegrading a fluid, flowing through or contained in a collection or treatment system, by seeding bacterial cultures to the fluid, said method comprising:
   (a) providing a biological injector that comprises at least one porous section for containing bacterial cultures, at least one non-porous solid section, with each porous section being attached to at least one non-porous solid section and with at least one non-porous solid section being used as a base to which some components of the biological injector can be attached, and at least one removable piece that is attached to one non-porous solid section;
   (b) removing a removable piece from the non-porous solid section and placing bacterial cultures in the biological injector;
   (c) attaching any removable piece to the corresponding solid section, such that all porous sections, non-porous solid sections and removable pieces of the biological injector form an enclosed container for storage of bacterial cultures; and
   (d) placing the biological injector within the fluid to be treated;

such that the bacterial cultures, that have been placed in the biological injector, are wetted by and released to an amount of the fluid which enters and exits the biological injector via openings in the porous section.

15. The method of claim 14, wherein the biological injector is fastened to a selected location within the collection or treatment system by a fastening means of the biological injector.

16. The method of claim 14, wherein liquid bacterial cultures, nutrients, surfactants, buffers or any combinations thereof are fed to the fluid via at least one means for feeding liquid bacterial cultures and additives that is attached to the biological injector.

17. The method of claim 14, wherein at least one additive from a group of additives consisting of nitrogenous salts, phosphorous salts, buffers, surfactants, enzymes and organic substrates is added, via the biological injector, to the fluid.

18. The method of claim 14, wherein the bacterial cultures that are added comprise at least one species of bacillus, thiobacillus, pseudomonas, escherichia, arthobacter, achromobacter, flavobacterium or bdellovibrio and any mixtures of said species.

19. The method of claim 14, wherein a removable piece is detached from the corresponding non-porous solid section and is replaced by another removable piece that fits the corresponding non-porous solid section.

20. The method of claim 14, wherein a carrier of bacterial cultures is placed in the biological injector, with the carrier consisting of a water-soluble plastic, such that the carrier starts to dissolve as soon as the carrier is contacted by the fluid.

* * * * *